(12) United States Patent
Murphy et al.

(10) Patent No.: US 11,639,731 B2
(45) Date of Patent: May 2, 2023

(54) FASTENER CLIP

(71) Applicant: A Raymond et Cie, Grenoble (FR)

(72) Inventors: Christopher Murphy, Clinton Township, MI (US); Mark Beyer, Armada, MI (US); James Mell, Chesterfield, MI (US)

(73) Assignee: A. RAYMOND ET CIE, Grenoble (FR)

( * ) Notice: Subject to any disclaimer, the term of this patent is extended or adjusted under 35 U.S.C. 154(b) by 192 days.

(21) Appl. No.: 17/162,739

(22) Filed: Jan. 29, 2021

(65) Prior Publication Data

US 2022/0243748 A1 Aug. 4, 2022

(51) Int. Cl.
*F16B 2/24* (2006.01)
*B60R 21/21* (2011.01)
*B60R 21/232* (2011.01)

(52) U.S. Cl.
CPC .............. *F16B 2/243* (2013.01); *B60R 21/21* (2013.01); *B60R 21/232* (2013.01)

(58) Field of Classification Search
CPC .... F16B 2/243; F16B 37/043; F16B 37/0842; B60R 21/21; B60R 21/232; B60R 21/075; B60R 11/00; B60R 13/0206; Y10T 24/307
See application file for complete search history.

(56) References Cited

U.S. PATENT DOCUMENTS

| | | | | |
|---|---|---|---|---|
| 5,919,019 A * | 7/1999 | Fischer | ................. | F16B 37/043 411/177 |
| 6,976,292 B2 * | 12/2005 | MacPherson | ......... | F16B 37/043 24/295 |
| 7,226,260 B2 * | 6/2007 | Jackson, Jr. | .......... | F16B 21/076 411/173 |
| 8,016,530 B2 * | 9/2011 | Johnson | ................ | F16B 37/043 411/173 |
| 8,474,111 B2 | 7/2013 | Marti | | |
| 9,453,523 B2 | 9/2016 | Maschat et al. | | |

(Continued)

FOREIGN PATENT DOCUMENTS

EP 2687731 A1 1/2014
EP 2689146 A1 1/2014
(Continued)

OTHER PUBLICATIONS

The International Search Report and Written Opinion of the International Searching Authority issued in PCT/IB2022/050684, dated May 12, 2022 (16 pages).

*Primary Examiner* — Robert Sandy
*Assistant Examiner* — Rowland Do
(74) *Attorney, Agent, or Firm* — Warner Norcross + Judd LLP

(57) ABSTRACT

An improved fastener clip for a side curtain airbag is provided. The fastener clip includes a head portion and a body portion having first and second expansion legs. During installation, the fastener clip is manually inserted through aligned openings in an airbag attachment member and a body panel. When a bolt is threaded into the fastener clip, the head portion engages an upper surface of the airbag attachment member and the expansion legs flex laterally outward and engage an underside of the body panel. Spring tabs extend from the head portion and absorb vibrations to provide a secure attachment over the life of the fastener clip.

20 Claims, 10 Drawing Sheets

(56) References Cited

U.S. PATENT DOCUMENTS

| | | | |
|---|---|---|---|
| 2005/0236861 A1* | 10/2005 | Slobodecki | F16B 37/043 296/39.1 |
| 2008/0260490 A1* | 10/2008 | Motsch | F16B 37/043 411/183 |
| 2009/0169326 A1* | 7/2009 | Hullmann | F16B 37/043 411/103 |
| 2009/0180842 A1 | 7/2009 | Johnson et al. | |
| 2011/0232049 A1 | 9/2011 | Marti | |
| 2011/0314646 A1 | 12/2011 | Marti | |
| 2015/0026934 A1 | 1/2015 | Johnson et al. | |
| 2020/0063779 A1 | 2/2020 | Mutz | |
| 2020/0392973 A1 | 12/2020 | Ammann et al. | |

FOREIGN PATENT DOCUMENTS

| | | |
|---|---|---|
| EP | 3245410 | 11/2017 |
| EP | 3748169 A1 | 12/2020 |

* cited by examiner

FASTENER CLIP

FIELD OF THE INVENTION

The present invention relates to a fastener clip, and in particular, a fastener clip for securing a side curtain airbag to a body panel.

BACKGROUND OF THE INVENTION

Side curtain airbags have for many years provided an increased measure of safety from side impacts. Side curtain airbags are unique in their point of attachment to the vehicle. Rather than being mounted within a steering wheel or a dashboard, side curtain airbags are typically secured directly to the vehicle frame and concealed from view beneath the headliner. One or more impact sensors within each B-pillar can trigger a gas inflator, causing the side curtain airbag to deploy downward from the headliner, typically in less than half a second.

The fastener clips that join the side curtain airbag to the vehicle frame play an important role in the performance of the side curtain airbag. The fastener clips must secure the curtain assembly to the vehicle frame while being easy to install and remove in the event the side curtain airbag needs to be repaired. The fastener clips should have a small assembly time, without the need for pre-hanging the curtain assembly, and if possible, without the need for welding operations, for example the application of a weld nut to a body panel.

Accordingly, there remains a continued need for an improved fastener clip for securing a side curtain assembly to a vehicle frame. In particular, there remains a continued need for a robust fastener clip that can be more easily installed to a vehicle frame and removed as needed, optionally without the need for pre-hanging the curtain assembly or weld nuts.

SUMMARY OF THE INVENTION

An improved fastener clip for a side curtain airbag is provided. The fastener clip includes a head portion and a body portion having first and second expansion legs. During installation, the fastener clip is manually inserted through aligned openings in an airbag attachment member and a body panel. When a bolt is threaded into the fastener clip, the head portion engages an upper surface of the airbag attachment member and the expansion legs flex laterally outward and engage an underside of the body panel. Spring tabs extend from the head portion and absorb vibrations to provide a secure attachment over the life of the fastener clip.

In one embodiment, the head portion of the fastener clip includes an upward facing surface terminating at first and second elongated peripheral edges. Each peripheral edge is inwardly curved to provide a smooth engagement surface for the airbag attachment member. The spring tabs extend downward from the upward facing surface and can flex to accommodate a full range of stackup tolerances (e.g., airbag materials, body frame thicknesses, airbag attachment members). The spring tabs provide sufficient tension to minimize fastener squeak and rattle when the fastener clip is pre-assembled within the airbag assembly.

In another embodiment, the body portion includes first and second preliminary retention tabs. The retention tabs include a rounded knuckle to prevent withdrawal of the fastener clip from the airbag assembly. The retention tabs also include an angled outer surface, such that the fastener clip can be easily inserted into an aligned opening in a body panel. In addition to the retention tabs, first and second expansion legs extend upward into the interior of the fastener clip. The expansion legs include a curved portion that comprises a hinge, such that the expansion legs can flex laterally outward when engaged by the shank of a threaded bolt. The expansion legs include folded tabs that extend through openings in the fastener clip to engage the underside of the airbag/body panel stackup.

The fastener clip of the present invention can provide a number of advantages over existing designs. For example, the fastener clip can eliminate the need for a weld nut and can eliminate the need for pre-hanging of the curtain assembly. The fastener clip can be pre-attached to an airbag attachment member with a bolt partially within the barrel opening. If the fastener clip is not fully seated in the airbag/body panel stackup, the expansion legs will bottom on the inside edge of the body panel opening, preventing the bolt (or screw) from being driven. In addition, the rolled or curved peripheral edges allow for a larger bearing surface to distribute the load on the fastener clip during airbag deployment, while also preventing cutting of the airbag curtain material. The body portion of the fastener clip also includes a sidewall with overlapping locking features to ensure the body portion does not spread out during assembly.

These and other features and advantages of the present invention will become apparent from the following description of the invention, when viewed in accordance with the accompanying drawings and appended claims.

DETAILED DESCRIPTION OF THE CURRENT EMBODIMENT

Figure 1:
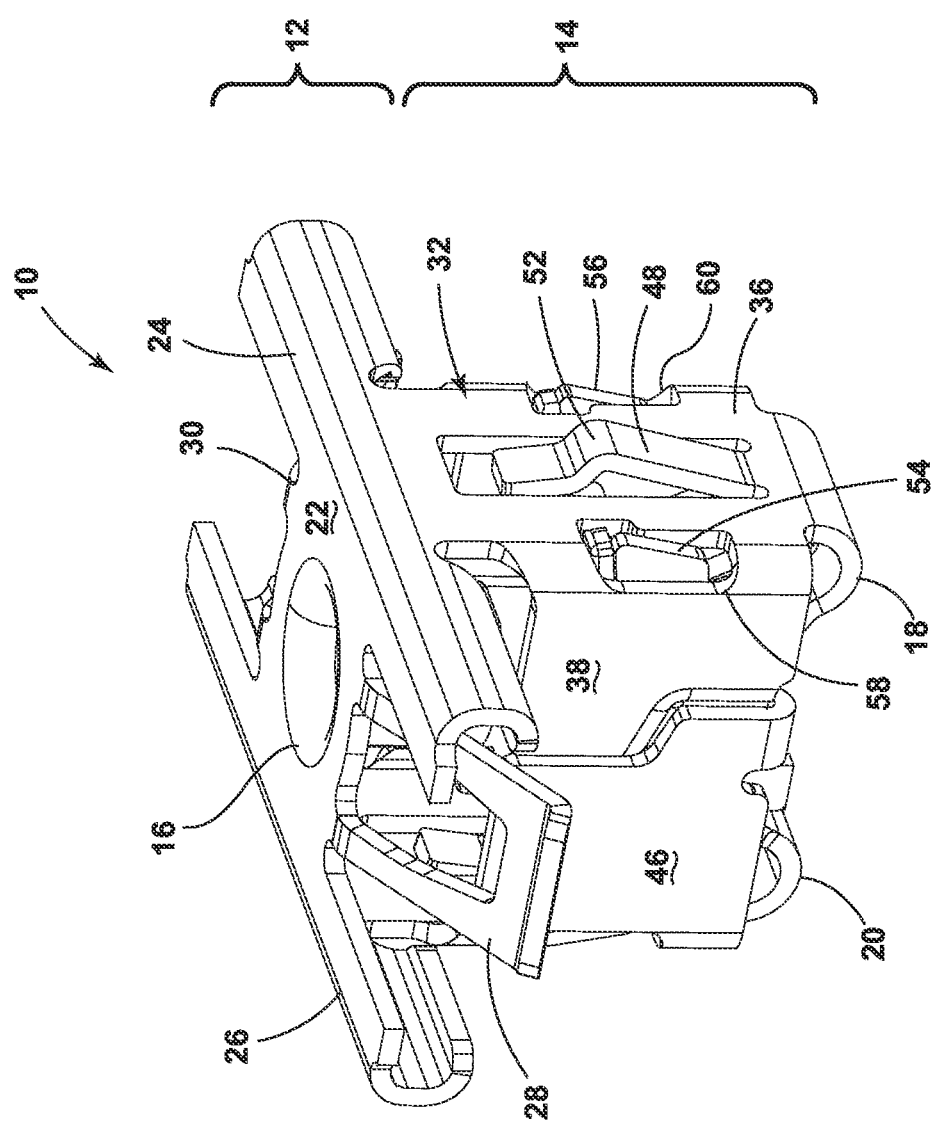
FIG. 1 is a perspective view of a fastener clip for a side curtain airbag.

Referring to FIGS. 1-10, a fastener clip in accordance with one embodiment is illustrated and generally designated 10. The fastener clip 10 includes a head portion 12 and a body portion 14 and can be formed from a metal or metal alloy, for example spring steel. The head portion 12 includes a barrel opening 16 for a bolt, and the body portion 14 includes first and second expansion legs 18, 20. As discussed below, the expansion legs 18, 20 flex outward when a bolt is fully inserted to retain the fastener clip 10 within a body panel opening.

More specifically, the head portion 12 includes an upward facing surface 22 defining the barrel opening 16 for receiving a bolt. The upward facing surface 22 terminates at a first elongated peripheral edge 24 and a second elongated peripheral edge 26. Each peripheral edge 24, 26 is inwardly curved, optionally by about 180 degrees, such that each peripheral edge 24, 26 curves downward and inward when viewed from the side. As also shown, each peripheral edge 24, 26 extends laterally beyond the body portion 14, such that the upward facing surface 22 is generally H-shaped when viewed from above. The curved (or rolled) peripheral edges 24, 26 provide a bearing surface to distribute compressive loads onto an airbag attachment member and prevent cutting or tearing of the airbag curtain material. The upward facing surface 22 is otherwise planar, and first and second spring tabs 28, 30 extend at a downward angle from the upward facing surface 22. The spring tabs 28, 30 can flex to accommodate a full range of stackup tolerances (e.g., airbag material, body frame, airbag attachment member). The spring tabs 28, 30 provide sufficient tension to minimize fastener squeak and rattle when the fastener clip 10 is in an intermediate fixed position, that is, partially inserted within a body panel opening.

Figure 6:
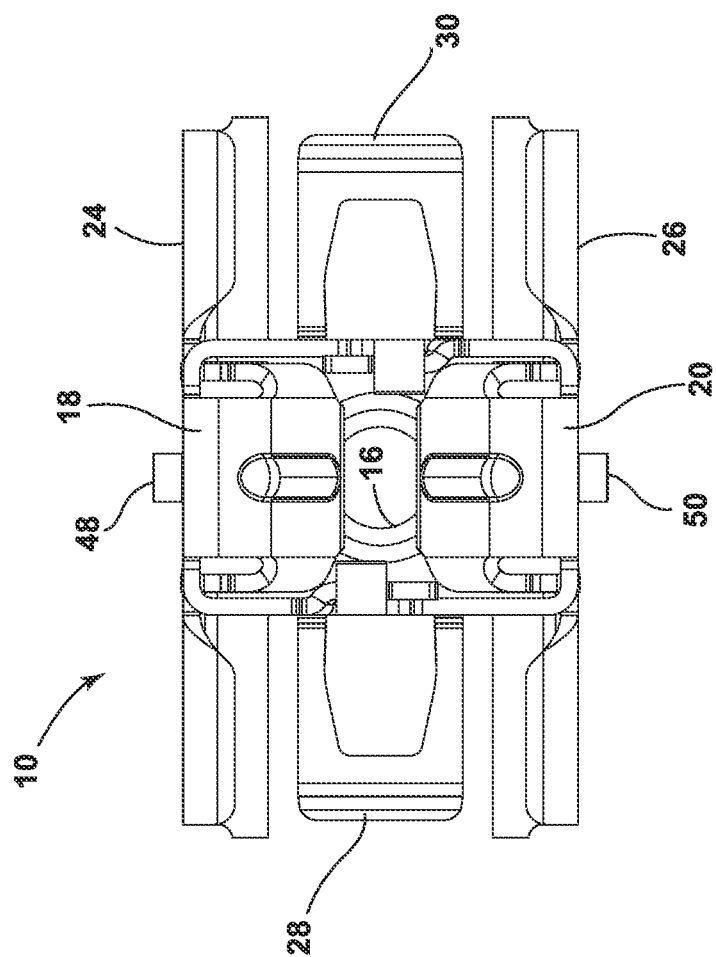
FIG. 6 is a bottom view of the fastener clip shown in FIG. 1.
Figure 7:
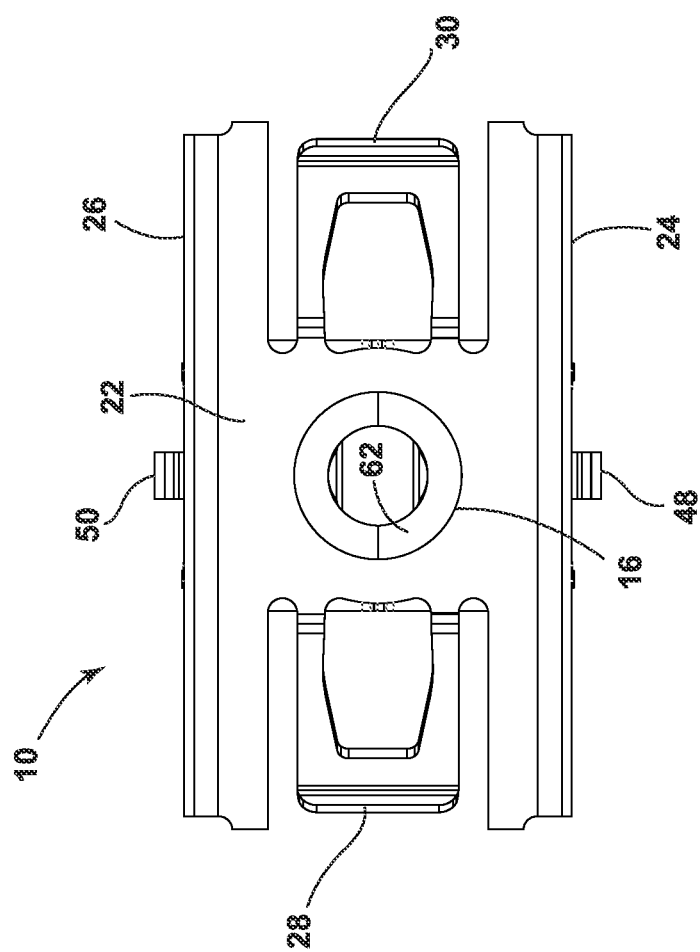
FIG. 7 is a top view of the fastener clip shown in FIG. 1.
Figure 8:
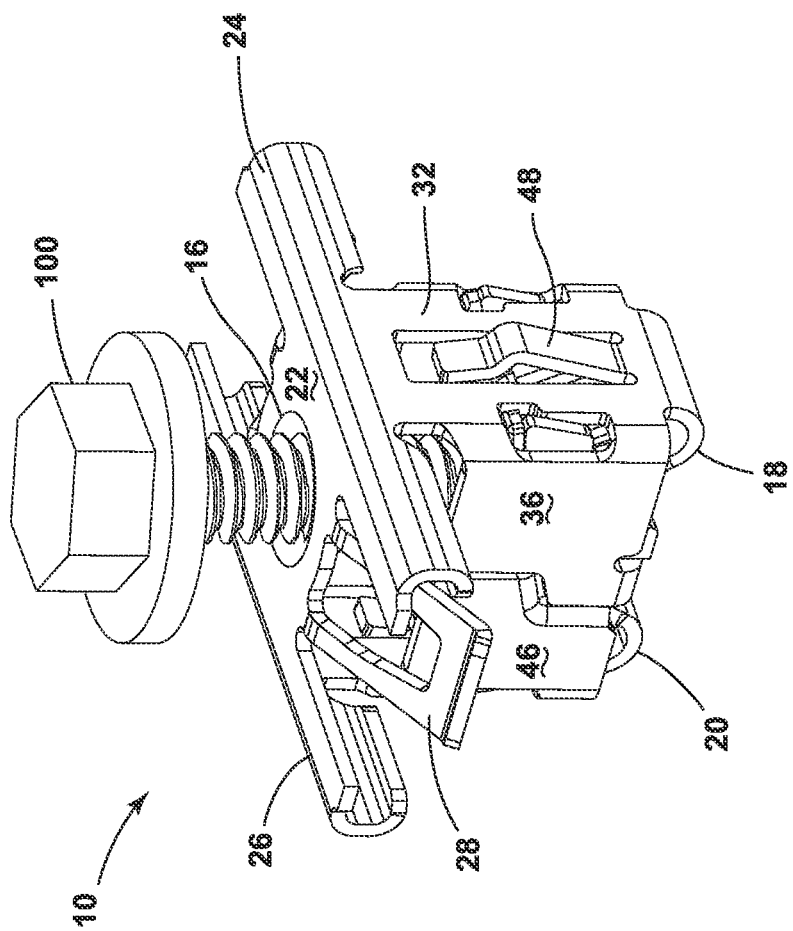
FIG. 8 is a perspective view of a fastener clip with a bolt partially seated therein.
Figure 9:
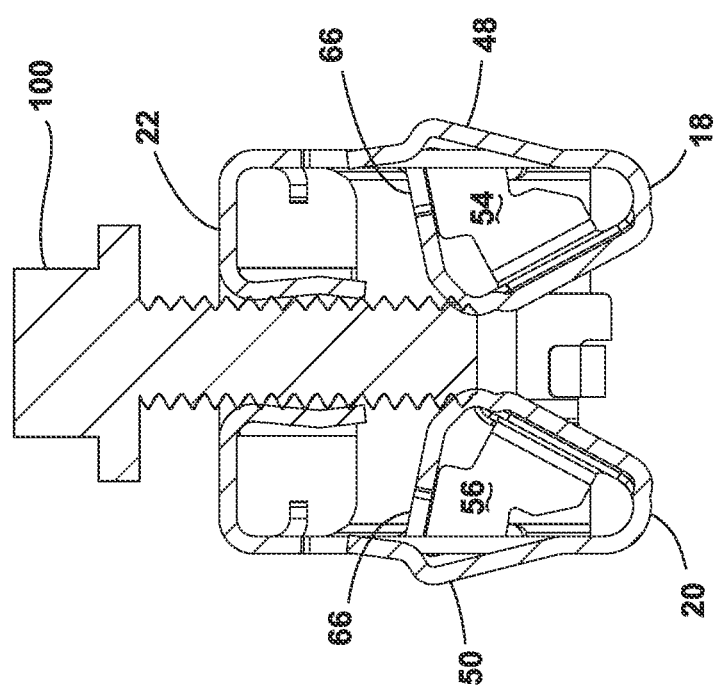
FIG. 9 is a cross-sectional view of the fastener clip and bolt of FIG. 9.

As noted above, the fastener clip 10 also includes a body portion 14. The body portion 14 includes first and second sidewalls 32, 34 extending downward from a mid-portion of the first and second peripheral edges 24, 26 respectively. The first sidewall 32 includes a central panel 36, a left-side panel 38 and a right-side panel 40. Similarly, the second sidewall 34 includes a central panel 42, a left-side panel 44, and a right-side panel 46. As shown in FIG. 6, the first and second sidewalls 32, 34 form a rigid box-like structure. The left-side panel 38 of the first sidewall 32 is co-planar with the right-side panel 46 of the second sidewall 34, with a partition therebetween. Similarly, the right-side panel 40 of the first sidewall 32 is co-planar with the left-side panel 44 of the second sidewall 34, with a partition therebetween. The adjoining panels include overlapping locking features, visible in FIGS. 3 and 4, to ensure that the body portion 14 does not spread apart during bolt assembly.

Figure 2:
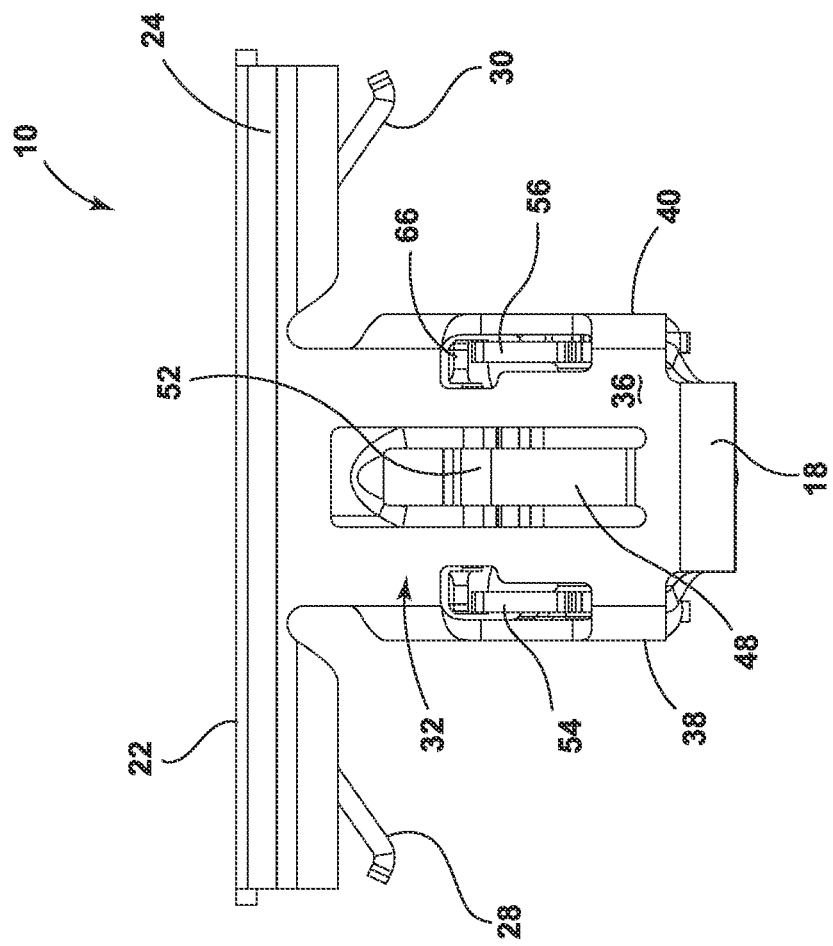
FIG. 2 is a first side elevation view of the fastener clip of FIG. 1.
Figure 3:
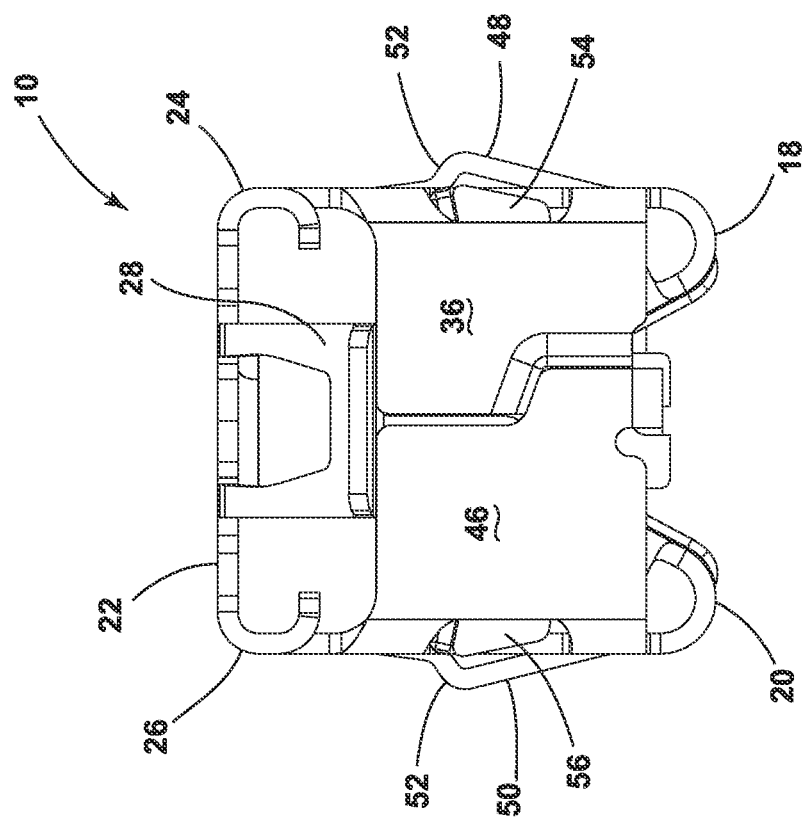
FIG. 3 is a second side elevation view of the fastener clip of FIG. 1.

As best shown in FIGS. 1 and 2, the body portion 14 includes first and second retention tabs 48, 50 that protrude outward from the first and second sidewalls 32, 34. The retention tabs 48, 50 are flexibly joined to the sidewalls 32, 34 and include an angled outer surface, such that the body portion 14 can be easily inserted into a body panel opening. Once the body panel opening clears a rounded knuckle 52 on the retention tabs 48, 50, the retention tabs 48, 50 spring outward, preventing removal of the fastener clip 10 from the body panel opening until depressed by a user. In this respect, the retention tabs 48, 50 retain the body portion 14 in the intermediate fixed position and can be depressed for easy removal of the fastener clip 10.

Figure 4:
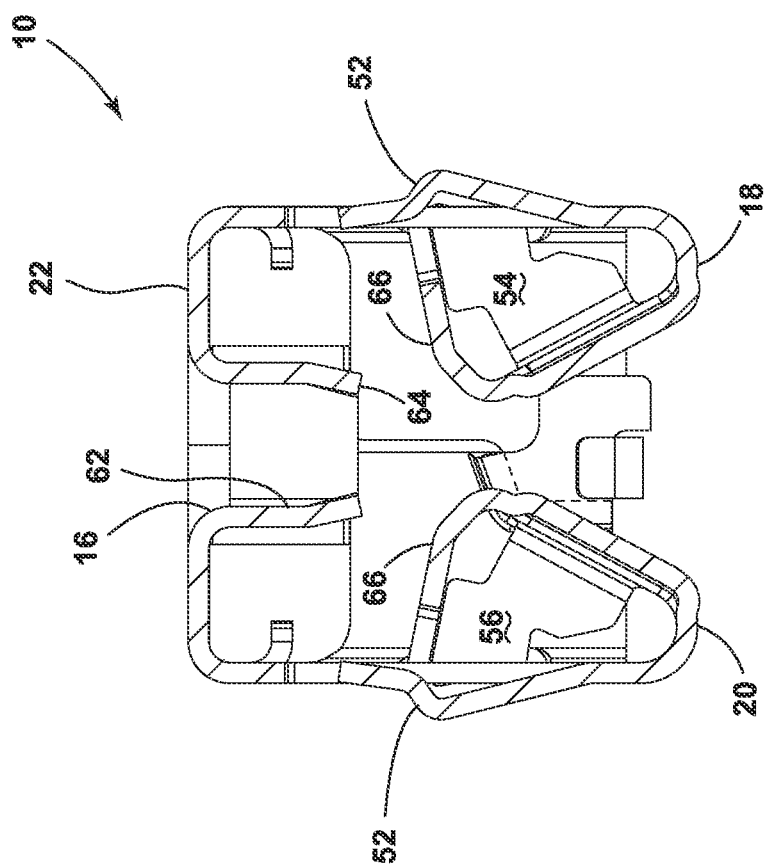
FIG. 4 is a first cross-sectional view of the fastener clip shown in FIG. 1.
Figure 5:
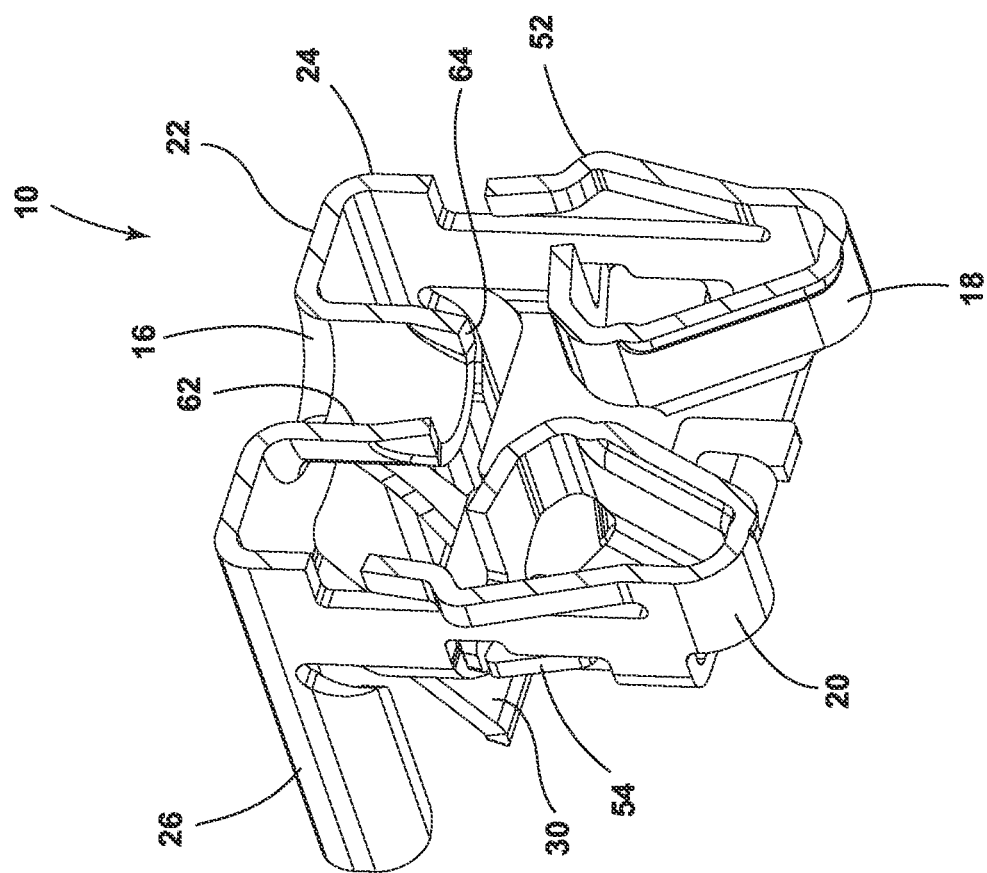
FIG. 5 is a second cross-sectional view of the fastener clip shown in FIG. 1.

As shown in FIGS. 4 and 5, the body portion 14 also includes first and second expansion legs 18, 20 joined to a lower peripheral edge of the first and second sidewalls 32, 34 The expansion legs 18, 20 curve upward into an interior cavity defined in the body portion 14. The lowermost portion of the expansion legs 18, 20 comprise a hinge that imparts elasticity to the expansion legs 18, 20 so that they can flex laterally. Each expansion leg 18, 20 includes first and second folded tabs 54, 56 that are parallel to each other and that are spaced apart from each other. When the expansion legs 18, 20 are engaged by a bolt, the bolt causes the expansion legs to flex laterally outward from within the interior cavity. From this position, the first and second folded tabs 54, 56 of the first expansion leg 18 protrude through first and second openings 58, 60 in the first sidewall 32. Similarly, the first and second folded tabs 54, 56 of the second expansion leg 20 protrude through first and second openings 58, 60 in the second sidewall 34. Each such opening 58, 60 comprises a vertical slot where the central panel joins the side panels.

Figure 10:
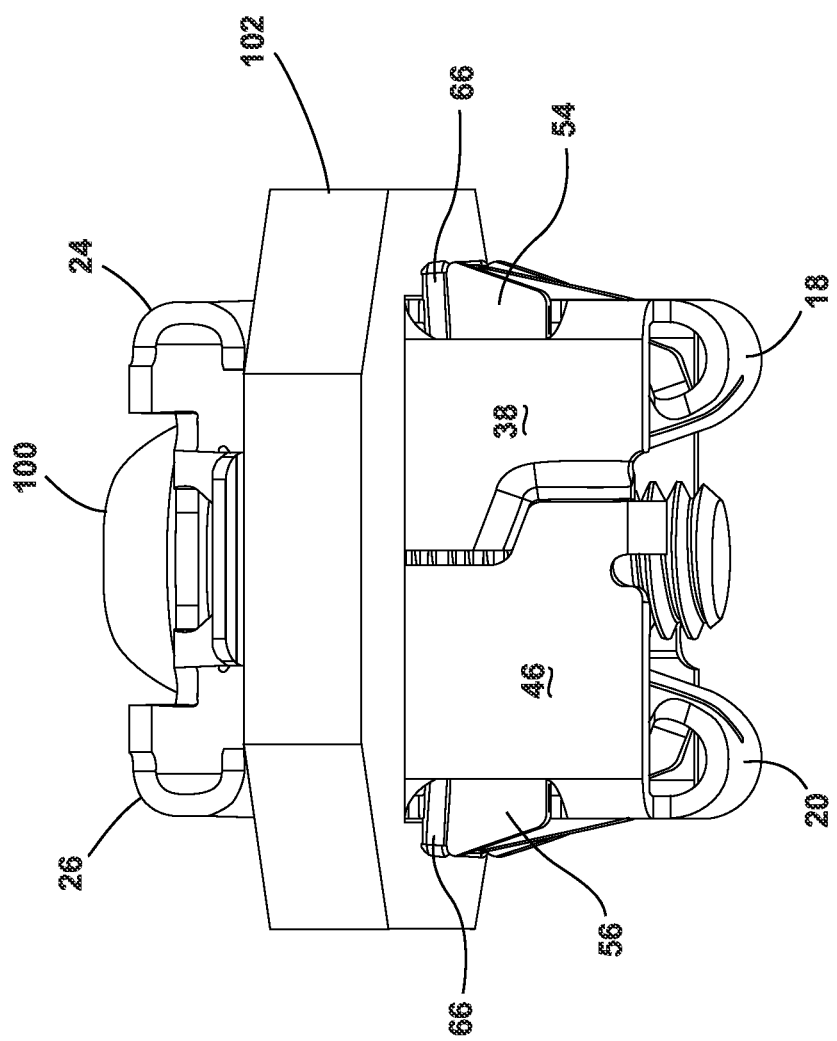
FIG. 10 is a side-view of a fastener secured to an airbag stackup.

In use, the fastener clip 10 is inserted through aligned openings in an airbag attachment member and a vehicle frame. A threaded bolt 100 is pre-positioned within the fastener clip 10 and extends into the barrel 62, generally shown in FIG. 9. At its terminal edge 64, the barrel 62 is narrowed to prevent withdrawal of the bolt prior during shipment and prior to final assembly. When the bolt is substantially fully inserted into the fastener clip 10, the head portion 12 lowers against the stackup, and the expansion legs 18, 20 flex laterally outward. Because the expansion legs 18, 20 are on the inside of the stackup 102 as shown in FIG. 10, the expansion legs 18, 20 (and in particular a U-shaped end-portion 66 and the folded tabs 54, 56) engage an underside of the stackup 102, for example the body panel. The spring tabs 28, 30 absorb vibrations and minimize squeak and rattle over the life of the fastener clip 10. When the bolt 100 is removed from the fastener clip 10, the expansion legs 18, 20 return to their initial position as shown in FIGS. 4 and 5, and the fastener clip 10 can be manually retracted from the body panel opening by depressing the retention tabs 48, 50 on either side of the body portion.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A fastener clip for a side curtain airbag comprising:
   a head portion including a barrel opening for receiving a bolt therein, the head portion further including first and second spring tabs on opposing sides of the barrel opening, the first and second spring tabs being angled downwardly from the head portion; and
   a body portion integrally joined to the head portion, the body portion including first and second interlocking sidewalls defining an interior cavity, the body portion further including first and second expansion legs that extends upwardly into the interior cavity, the expansion legs including a curved hinge and first and second folded tabs that are spaced apart from each other;

wherein, upon insertion of the bolt into the barrel opening, the bolt protrudes into the interior cavity and engages the first and second expansion legs, causing the first and second expansion legs to flex laterally outward, such that the first and second folded tabs protrude outward through openings in the first and second interlocking sidewalls.

2. The fastener clip of claim 1 wherein the first and second interlocking sidewalls each include a retention tab protruding laterally outward therefrom.

3. The fastener clip of claim 2 wherein each retention tab includes a sloped surface and a rounded knuckle.

4. The fastener clip of claim 1 wherein the head portion further includes a barrel extending from the barrel opening into the interior cavity, the barrel terminating at a narrowed opening to prevent withdrawal of the bolt prior to final installation.

5. The fastener clip of claim 1 wherein the head portion includes an upward facing surface terminating at first and second inwardly curved peripheral edges.

6. The fastener clip of claim 5 wherein the first and second inwardly curved peripheral edges comprise a rounded bearing surface.

7. The fastener clip of claim 5 wherein the upward facing surface of the head portion is generally H-shaped.

8. The fastener clip of claim 1 wherein each of the first and second sidewalls include a central panel, a left-side panel, and a right-side panel.

9. The fastener clip of claim 1 wherein the head portion and the body portion are formed from spring steel.

10. The fastener clip of claim 1 wherein the first and second expansion legs are integral extensions of the first and second sidewalls, respectively.

11. A fastener clip for a side curtain airbag, the fastener clip comprising:
a head portion including an upward facing surface defining a barrel opening for receiving a bolt therein, the upward facing surface terminating at first and second peripheral edges, the first and second peripheral edges being inwardly curved; and
a body portion integrally joined to the head portion, the body portion including first and second sidewalls extending downward from the first and second peripheral edges, respectively;
wherein the first and second sidewalls each include a retention tab protruding laterally outward therefrom, the retention tab being adapted to retain the body portion in an intermediate position within an opening prior to final installation of the fastener clip;
wherein the lowermost portion of the first and second sidewalls are joined to an expansion leg that extends upwardly into an interior cavity of the body portion, the expansion leg including first and second folded tabs that are parallel to and spaced apart from each other.

12. The fastener clip of claim 11, wherein the head portion further includes first and second spring tabs on opposing sides of the barrel opening, the first and second spring tabs being angled downwardly from the upward facing surface of the head portion.

13. The fastener clip of claim 11, wherein:
the first sidewall defines first and second openings for the first and second folded tabs of the first expansion leg; and
the second sidewall defines first and second openings for the first and second folded tabs of the second expansion leg.

14. The fastener clip of claim 11, wherein the head portion further includes a barrel extending from the barrel opening into the interior cavity, the barrel terminating at a narrowed opening to prevent withdrawal of the bolt prior to final installation.

15. The fastener clip of claim 11 wherein the retention tab includes a rounded knuckle that can be depressed to allow extraction of the body portion from the opening.

16. The fastener clip of claim 11 wherein the retention tab is positioned midway between the first and second openings.

17. The fastener clip of claim 11 wherein the inwardly curved first and second peripheral edges provide a rounded bearing surface on an underside thereof.

18. The fastener clip of claim 11 wherein each of the first and second sidewalls include a left-side panel and a right-side panel that define the lateral side portions of the interior cavity.

19. The fastener clip of claim 11 wherein the upward facing surface of the head portion is generally H-shaped.

20. The fastener clip of claim 11 wherein the head portion and the body portion are formed from spring steel.

* * * * *